United States Patent
Singer et al.

(10) Patent No.: US 11,486,819 B2
(45) Date of Patent: Nov. 1, 2022

(54) DETECTION ARRANGEMENT AND METHOD FOR PRODUCING DETECTION ARRANGEMENTS

(71) Applicant: OSRAM Opto Semiconductors GmbH, Regensburg (DE)

(72) Inventors: Frank Singer, Regenstauf (DE); Matthias Sperl, Mintraching (DE)

(73) Assignee: OSRAM OLED GMBH, Regensburg (DE)

( * ) Notice: Subject to any disclaimer, the term of this patent is extended or adjusted under 35 U.S.C. 154(b) by 112 days.

(21) Appl. No.: 16/323,504

(22) PCT Filed: Aug. 3, 2017

(86) PCT No.: PCT/EP2017/069704
§ 371 (c)(1),
(2) Date: Jun. 28, 2019

(87) PCT Pub. No.: WO2018/024840
PCT Pub. Date: Feb. 8, 2018

(65) Prior Publication Data
US 2020/0018692 A1    Jan. 16, 2020

(30) Foreign Application Priority Data

Aug. 5, 2016 (DE) .......................... 102016114542.4

(51) Int. Cl.
G01N 21/3504 (2014.01)
(52) U.S. Cl.
CPC . *G01N 21/3504* (2013.01); *G01N 2201/0228* (2013.01); *G01N 2201/0634* (2013.01); *G01N 2201/0636* (2013.01)

(58) Field of Classification Search
CPC .. G01J 3/021; G01J 3/42; G01J 1/4257; G01J 5/12; G01N 21/0303; G01N 21/3504;
(Continued)

(56) References Cited

U.S. PATENT DOCUMENTS 5,550,375 A * 8/1996 Peters ....................... G01J 3/02
                                                         250/343
6,097,034 A * 8/2000 Weckstrom .......... A61B 5/0836
                                                         250/343
(Continued)

FOREIGN PATENT DOCUMENTS

DE            10200908 A1     7/2003
DE       202005010475 U1    10/2005
(Continued)

*Primary Examiner* — Tri T Ton
(74) *Attorney, Agent, or Firm* — Slater Matsil, LLP (57) ABSTRACT

A detection assembly and a method for producing a detection assemblies are disclosed. In an embodiment a detection arrangement includes an emitter configured to generate radiation having a peak wavelength in an infrared spectral range, a detector configured to receive the radiation, a mounting surface comprising at least a first contact surface and a second contact surface for external electrical connection of the detection arrangement, a form body adjoining the emitter and the detector at least in places and deflection optics, on which the radiation impinges during operation of the detection arrangement so that an optical path is formed between the emitter and the detector by the deflection optics, wherein the deflection optics include a scattering body into which the radiation enters during the operation through a surface of the scattering body facing the emitter.

6 Claims, 10 Drawing Sheets

(58) Field of Classification Search
CPC ... G01N 2201/0228; G01N 2201/0634; G01N 2201/0636
USPC ............... 356/426–428, 445–448, 213–236, 356/432–444
See application file for complete search history.

(56) References Cited

U.S. PATENT DOCUMENTS

| | | |
|---|---|---|
| 9,859,473 B2 | 1/2018 | Gootz et al. |
| 2002/0105650 A1 | 8/2002 | Stuttard |
| 2008/0061237 A1* | 3/2008 | Franz .................. G01J 5/0803 250/339.01 |
| 2008/0159341 A1* | 7/2008 | Patel .................. G01N 21/1702 372/20 |
| 2014/0070101 A1* | 3/2014 | Matsushima .......... G01N 21/17 250/338.5 |
| 2014/0333924 A1 | 11/2014 | Martin |
| 2015/0340351 A1 | 11/2015 | Rossi et al. |
| 2016/0327475 A1* | 11/2016 | Hayashi ............. G01N 21/3504 |
| 2017/0052277 A1* | 2/2017 | Wong ........................ G01V 8/12 |
| 2020/0184790 A1* | 6/2020 | Etschmaier .......... G08B 17/107 |

FOREIGN PATENT DOCUMENTS

| | | |
|---|---|---|
| DE | 102013106573 A1 | 12/2014 |
| EP | 1358472 A1 | 11/2003 |
| EP | 2677300 A2 | 12/2013 |
| EP | 2743677 A1 | 6/2014 |

* cited by examiner

DETECTION ARRANGEMENT AND METHOD FOR PRODUCING DETECTION ARRANGEMENTS

This patent application is a national phase filing under section 371 of PCT/EP2017/069704, filed Aug. 3, 2017, which claims the priority of German patent application 102016114542.4, filed Aug. 5, 2016, each of which is incorporated herein by reference in its entirety.

TECHNICAL FIELD

The present arrangement relates to a detection arrangement and a method for producing detection arrangements.

BACKGROUND

Gas sensors using the absorption characteristic of the respective gas in the infrared spectral range are commercially available for the detection of gases. However, these gas sensors have comparatively large designs so that they are not or only conditionally suitable for various applications, for example, for use in mobile devices or in mobile communication devices.

SUMMARY OF THE INVENTION

Embodiments provide a detection arrangement with which reliable detection can be achieved with a simultaneously compact design. Furthermore, further embodiments provide a method for producing a detection arrangement in a simple and reliable manner.

According to at least one embodiment of the detection arrangement, the detection arrangement has a mounting surface. The mounting surface is provided for attaching the detection arrangement and in particular also for electrically connecting the detection arrangement. In particular, at least a first contact surface and a second contact surface for the external electrical connection of the detection arrangement are formed on the mounting surface. For example, all of the external contacts required for operating the detection arrangement are accessible on the mounting surface.

According to at least one embodiment of the detection arrangement, the detection arrangement has an emitter which is provided in particular for generating radiation with a peak wavelength in the infrared spectral range. For example, the peak wavelength is between 1 µm inclusively and 6 µm inclusively. A main emission direction of the emitter extends perpendicularly to the mounting surface, for example.

According to at least one embodiment of the detection arrangement, the detection arrangement has a detector for receiving the radiation. A spectral sensitivity distribution of the detector is expediently adapted to the spectral emission characteristic of the emitter and/or a characteristic absorption range for a gas to be detected. A main detection direction of the detector extends perpendicularly to the mounting surface, for example.

According to at least one embodiment of the detection arrangement, the detection arrangement has a form body. In particular, the form body adjoins the emitter and/or the detector in places. The form body is, for example, non-transparent to radiation generated by the emitter. The form body can be designed to be predominantly absorbing or predominantly reflective to the radiation. In this context, "predominantly absorbing" means that at least 60% of impinging radiation having the peak wavelength is absorbed. Accordingly, "predominantly reflective" means that at least 60% of impinging radiation having the peak wavelength is reflected.

The form body can in particular completely encircle the emitter and/or detector in the lateral direction. For example, the form body is molded onto the detector and/or onto the emitter. For example, the form body is designed to be electrically insulating. In particular, the form body may comprise a polymer material, for example, an epoxide, a silicone or a hybrid material with a silicone and/or an epoxide.

According to at least one embodiment of the detection arrangement, the detection arrangement comprises a deflection optics. The deflection optics is in particular arranged relatively to the emitter such that radiation emitted by the emitter during operation at least in part impinges on the deflection optics.

The term "deflection optics" is generally understood to mean an optical element or an arrangement of optical elements, wherein a change in direction of the impinging radiation is effected by reflection, for example, directed reflection, diffuse reflection or total reflection, and/or by refraction and/or by scattering.

According to at least one embodiment of the detection arrangement, an optical path between the emitter and the detector is formed by means of the deflection optics.

In the context of the application, the shortest optical path that radiation can take from the emitter to the detector is in particular understood as the optical path. However, not all of the radiation has to take this optical path. Rather, a portion of the radiation may also take a longer optical path from the emitter to the detector and impinge on the detector after several reflections within the detection arrangement, for example.

For example, the deflection optics is designed such that the radiation emitted by the emitter can impinge on the detector only after at least once impinging on the deflection optics. The deflection optics is, for example, attached to the emitter and/or to the detector and/or to the form body by means of an attachment layer or borders directly on the emitter and/or the detector and/or the form body.

The deflection optics may in particular be designed as planar optics. For example, the deflection optics has an extent of at most 5 mm in the vertical direction, in particular an extent of at most 2 mm. During production, the optics is, for example, formed directly on the form body. An attachment layer is not required in this case.

The vertical direction is understood to be a direction perpendicular to the mounting surface. A lateral direction runs parallel to the mounting surface.

In at least one embodiment of the detection arrangement, the detection arrangement comprises a mounting surface, on which at least a first contact surface and a second contact surface for the external electrical connection of the detection arrangement are formed. The detection arrangement furthermore comprises an emitter for generating radiation having a peak wavelength in the infrared spectral range and a detector for receiving the radiation. The detection arrangement furthermore comprises a form body which adjoins the emitter and the detector at least in places, and a deflection optics, on which radiation emitted by the emitter during operation of the detection arrangement impinges, wherein an optical path is formed between the emitter and the detector by means of the deflection optics.

The detection arrangement is characterized by a particularly compact design. The detection arrangement may also be electrically connected externally with particular ease. For example, the detection arrangement is designed as a surface-mounted device (SMD).

In the vertical direction, the form body may have the same extent or substantially the same extent, for instance with a deviation of at most 20%, as the semiconductor chip of the emitter and/or the detector. This simplifies a compact design of the detection arrangement as viewed in the vertical direction.

According to at least one embodiment of the detection arrangement, the emitter is electrically conductively connected via a through-connection through the form body to the first contact surface and the detector is electrically conductively connected via a further through-connection through the form body to the second contact surface. The emitter and the detector may thus be electrically connected in the vertical direction through the form body.

According to at least one embodiment of the detection arrangement, the form body forms the mounting surface. For example, the form body establishes a mechanically stable connection between the emitter and the detector. An additional element, such as a prefabricated housing in which the emitter and the detector are arranged, is therefore not necessary. A compact design of the detection arrangement can thus be achieved particularly easily.

According to at least one embodiment of the detection arrangement, the detection arrangement has a connection carrier. In particular, the connection carrier forms the mounting surface. For example, the form body is arranged on the connection carrier and a side of the connection carrier facing away from the form body forms the mounting surface.

The connection carrier comprises, for example, a semiconductor material, a ceramic or a polymer material. An electrical connection of the emitter and/or the detector may be established via openings extending in the vertical direction through the connection carrier.

According to at least one embodiment of the detection arrangement, the optical path extends parallelly to the mounting surface in places. For example, the deflection optics comprises a first deflection element, which deflects the radiation emitted along the main emission direction of the emitter in a direction parallel to the mounting surface. A comparatively long optical path between the emitter and the detector may thus also be achieved in the case of a small vertical extent of the detection arrangement.

According to at least one embodiment of the detection arrangement, the optical path parallel to the mounting surface is formed by means of the deflection optics in such a way that it is at least twice as long as a distance between the emitter and the detector. In other words, the deflection optics effects a folding of the optical path. In the design of the detection arrangement as a gas sensor, interaction between the radiation emitted by the emitter and the gas to be measured thus increases with the same lateral extent of the detection arrangement.

According to at least one embodiment of the detection arrangement, the deflection optics delimits a gas volume above the emitter and the detector on a side facing away from the mounting surface. For example, the deflection optics forms a reflector element facing the emitter and the detector. The reflector element can in particular be concave as viewed from the mounting surface in the vertical direction. In a top view of the detection arrangement, the reflector element in particular completely covers the emitter and the detector.

According to at least one embodiment of the detection arrangement, the deflection optics is formed by a scattering body. For example, the radiation generated during operation of the detection arrangement enters the scattering body through a surface of the scattering body facing the emitter. The radiation may in particular be deflected at least partially toward the detector by means of a scattering within the scattering body. For example, interfaces or refraction index inhomogeneities, which effect a scattering, are formed in the scattering body. The scattering body contains, for example, a semiconductor material in which defects of the crystal structure cause scattering.

According to at least one embodiment of the detection arrangement, a surface of the scattering body facing the emitter and/or the detector is transparent to radiation and at least one further surface of the scattering body is mirrored. "Mirrored" means, in particular, that at least 60% of the impinging radiation having the peak wavelength is reflected. In particular, only surfaces of the scattering body facing the emitter and/or detector can be transparent to radiation and the other surfaces of the scattering body can be non-transparent to radiation. In particular, all surfaces of the scattering body facing neither the emitter nor the detector can be non-transparent to radiation and in particular mirrored. Radiation scattered in the scattering body therefore does not exit surfaces facing away from the emitter and/or the detector. The radiation portion scattered toward the detector and exiting the scattering body is thus increased.

According to at least one embodiment of the detection arrangement, the emitter comprises an optically and/or electrically pumped quantum structure for generating the radiation.

The term "quantum structure" includes, in the context of the application, in particular any structure in which charge carriers can experience a quantization of their energy states through inclusion ("confinement"). In particular, the term "quantum structure" does not include any information about the dimensionality of the quantization. It thus includes, inter alia, quantum wells, quantum wires, quantum rods and quantum dots and any combination of these structures.

For example, the emitter comprises a semiconductor chip having an active region that generates the radiation having the peak wavelength. Alternatively, a radiation conversion element may be arranged downstream of the active region in the emission direction and converts the primary radiation generated by the active region completely or at least partially into secondary radiation having the peak wavelength.

For example, the emitter is designed as a light-emitting diode, as a superluminescent diode or as a laser, in particular as a surface-emitting laser. The generation of radiation may take place via interband transitions, that is to say radiative recombination between electrons and holes, or intersubband transitions, i.e., radiative transitions within the conduction band or within the valence band. For example, the semiconductor chip is designed as a quantum cascade diode or as an interband cascade diode.

The radiation conversion element has, in particular, a quantum structure. With quantum structures, spectrally narrowband emission spectra can be achieved in a simplified manner.

For example, the conversion material comprises quantum dots. Such quantum dots, which convert impinging radiation into secondary radiation having a peak wavelength in the infrared spectral range, are described in publication WO 2014/206936, whose disclosure in this respect is explicitly incorporated into the present application by reference.

In principle, however, another radiation conversion material which emits radiation having the desired peak wavelength is also suitable.

According to at least one embodiment of the detection arrangement, the detection arrangement is provided to detect a gas. For example, the peak wavelength of the emitter is adapted to an absorption range of the gas to be detected. For example, the peak wavelength of the emitter and an absorption maximum of the gas to be detected differ from each other by at most 200 nm, in particular by at most 100 nm.

Further embodiments provide a method for producing detection arrangements.

According to at least one embodiment of the method, a plurality of emitters and a plurality of detectors are provided. An arrangement group is formed with the emitters and the detectors. A plurality of deflection optics is assigned to the emitters in the arrangement group. The arrangement group is separated into a plurality of detection arrangements so that each detection arrangement has at least one emitter, at least one detector and at least one deflection optics, wherein an optical path is formed between the emitter and the detector by means of the deflection optics.

The detection arrangements can thus be produced in a group so that the detection arrangements arising during the separation of the arrangement group already have the respectively assigned deflection optics.

According to at least one embodiment of the method, the emitters and the detectors are insert-molded using a molding compound in order to form the arrangement group. For example, before being insert-molded using the molding compound, the emitters and the detectors are arranged on an auxiliary carrier, which can be removed after forming the molding compound. Upon separating the arrangement group, the form body formed in particular by means of the molding compound can be severed so that the form bodies have separation marks characteristic of the separation method on the side faces produced during separation, for example, marks of a mechanical removal, such as saw marks, or marks of material removal by means of coherent radiation.

When the arrangement group is formed, the emitters do not necessarily already have to be configured for emitting the desired wavelength. For example, a radiation conversion element of the emitters may also be applied only after the arrangement group is formed.

According to at least one embodiment of the method, the emitters and the detectors for forming the arrangement group are arranged on a connection carrier and subsequently insert-molded using a molding compound. The emitters and/or the detectors are electrically connected at least partially only after the emitters and the detectors have been insert-molded using the molding compound.

According to at least one embodiment of the method, the plurality of deflection optics is formed on the arrangement group. In other words, the arrangement group is not equipped with prefabricated deflection optics, but the deflection optics are formed directly on the arrangement group. An attachment layer for attaching the deflection optics on the arrangement group is therefore not necessary.

According to at least one embodiment of the method, an optical compound is applied to the arrangement group and shaped by means of a template. After an at least partial curing of the optical compound, the template can be removed again. Through the design of the template, the vertical and lateral extent of the individual structural elements to be produced by the template can be varied within wide limits.

According to at least one embodiment of the method, a sacrificial layer is applied to the arrangement group and a reflector layer is applied to the sacrificial layer. After the application of the reflector layer, the sacrificial layer can be removed so that a gas volume arises between the emitters and the reflector layer. In the production of the reflector layer, the sacrificial layer thus serves to form a distance between the emitters and the reflector layer. In this way, a reflector element in the form of a reflector layer can be formed.

According to at least one embodiment of the method, the plurality of deflection optics is arranged in prefabricated form on the arrangement group. The deflection optics can be arranged individually on the arrangement group for this purpose. The arrangement group is thus equipped with individual prefabricated deflection optics. Alternatively, the deflection optics can be applied on the arrangement group in the form of an optics group. During separation into detection arrangements, the optics group can be severed.

The method described is particularly suitable for the production of the detection arrangement described above. Features described in connection with the detection arrangement can therefore also be used for the method and vice versa.

BRIEF DESCRIPTION OF THE DRAWINGS

Further embodiments and expediencies result from the following description of the exemplary embodiments in conjunction with the figures.

The figures show.

The same, similar or identically acting elements are provided in the figures with the same reference signs.

The figures are schematic diagrams and therefore not necessarily true to scale. Rather, the illustration of comparatively small elements and in particular layer thicknesses may be excessively large for the sake of clarity.

DETAILED DESCRIPTION OF ILLUSTRATIVE EMBODIMENTS

Figure 1:
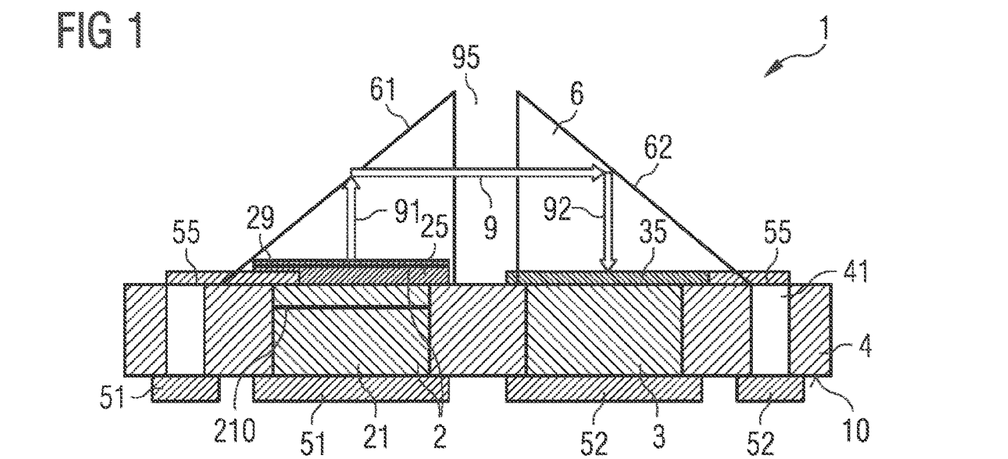
FIGS. 1 and 2 each show an exemplary embodiment of a detection arrangement in a schematic sectional view.

FIG. 1 shows an exemplary embodiment of a detection arrangement 1 in a schematic sectional view. The detection arrangement 1 comprises a mounting surface 10 on which are formed first contact surfaces 51 and second contact surfaces 52 for the external electrical connection of the detection arrangement.

The detection arrangement 1 comprises an emitter 2 for generating radiation having a peak wavelength in the infrared spectral range. In the illustrated exemplary embodiment, the emitter comprises a semiconductor chip 21 with an active region 210 provided for generating radiation and a radiation conversion element 25. The radiation conversion element is provided for generating primary radiation generated in the active region 210 into secondary radiation having the desired peak wavelength of the detection arrangement. The radiation conversion element 25 has a quantum structure 29, for example, a quantum well structure or a quantum dot structure.

The semiconductor chip 21 thus optically pumps the radiation conversion element 25, in particular the quantum structure 29 of the radiation conversion element.

The peak wavelength of the emitted secondary radiation can be adjusted via the material composition and/or the extent of the quantum structures.

In deviation from the described exemplary embodiment, however, the active region 210 of the semiconductor chip 21 can itself already provide the radiation having the desired peak wavelength so that a downstream radiation conversion element is not required for this purpose.

The active region 210 of the radiation-emitting semiconductor chip 21 is based, for example, on an arsenide compound semiconductor material, a phosphide compound semiconductor material or a nitride compound semiconductor material.

"Based on nitride compound semiconductors" in the present context means that the active epitaxy layer sequence or at least one layer thereof comprises a nitride III/V compound semiconductor material, preferably $Al_nGa_mIn_{1-n-m}N$, where $0 \leq n \leq 1$, $0 \leq m \leq 1$ and $n+m \leq 1$. This material does not necessarily have to have a mathematically exact composition according to the above formula. Rather, it may have one or more dopants as well as additional constituents, which do not substantially change the characteristic physical properties of the material. For the sake of simplicity, however, the above formula only includes the essential constituents of the crystal lattice (Al, GA, In, N), even if they can be replaced in part by small amounts of other substances.

"Based on phosphide compound semiconductors" in this context means that the semiconductor body, in particular the active region, preferably comprises $Al_nGa_mIn_{1-n-m}P$, where $0 \leq n \leq 1$, $0 \leq m \leq 1$ and $n+m \leq 1$, preferably with $n \neq 0$ and/or $m \neq 0$. This material does not necessarily have to have a mathematically exact composition according to the above formula. Rather, it may have one or more dopants as well as additional constituents, which do not substantially change the physical properties of the material. For the sake of simplicity, however, the above formula only includes the essential constituents of the crystal lattice (Al, GA, In, P), even if they can be replaced in part by small amounts of other substances.

"Based on arsenide compound semiconductors" in this context means that the semiconductor body, in particular the active region, preferably comprises $Al_nGa_mIn_{1-n-m}As$, where $0 \leq n \leq 1$, $0 \leq m \leq 1$ and $n+m \leq 1$, preferably with $n \neq 0$ and/or $m \neq 0$. This material does not necessarily have to have a mathematically exact composition according to the above formula. Rather, it may have one or more dopants as well as additional constituents, which do not substantially change the physical properties of the material. For the sake of simplicity, however, the above formula only includes the essential constituents of the crystal lattice (Al, GA, In, As), even if they can be replaced in part by small amounts of other substances.

"Based on antimonide compound semiconductors" in this context means that the semiconductor body, in particular the active region, preferably comprises $Al_nGa_mIn_{1-n-m}Sb$, where $0 \leq n \leq 1$, $0 \leq m \leq 1$ and $n+m \leq 1$, preferably with $n \neq 0$ and/or $m \neq 0$. This material does not necessarily have to have a mathematically exact composition according to the above formula. Rather, it may have one or more dopants as well as additional constituents, which do not substantially change the physical properties of the material. For the sake of simplicity, however, the above formula only includes the essential constituents of the crystal lattice (Al, GA, In, Sb), even if they can be replaced in part by small amounts of other substances.

For example, a compound semiconductor material, whose band gaps correspond to a wavelength in the aforementioned spectral range, for example, an antimonide compound semiconductor material, is suitable for a semiconductor chip 21 which itself generates radiation in the infrared spectral range, in particular between 1 μm inclusively and 6 μm inclusively.

Alternatively suitable is, for example, a quantum structure 29 of a compound semiconductor material in which the radiation emission is effected by radiative transitions between subbands of the conduction band or of the valence band. For example, an antimonide compound semiconductor material, an arsenide compound semiconductor material or a phosphide compound semiconductor material is suitable for this purpose.

The semiconductor chip 21 can be designed to emit incoherent radiation, partially coherent or coherent radiation. For example, the semiconductor chip 21 can be designed as a light-emitting diode, a superluminescent diode or a laser, in particular a surface-emitting laser. For example, the semiconductor chip 21 is designed as a quantum cascade or interband cascade diode for generating coherent radiation.

The detection arrangement 1 furthermore comprises a detector 3 which is provided to detect a portion of the radiation emitted by the emitter 2. For example, an active region based on mercury cadmium telluride (HgCdTe, also referred to as MCT) or indium antimonide (InSb) is suitable for the detector.

The detector 3 can also be based on intersubband transitions and be designed, for example, as a quantum well infrared photodetector (QWIP). Such detectors can be characterized by a spectrally narrowband sensitivity distribution.

For a narrowband sensitivity distribution, a filter 35 can optionally be arranged on the detector 3. For example, the filter alone or in conjunction with the band gap of the material of the detector 3 forms a bandpass filter.

For example, the filter 35 is formed by dielectric layers arranged on a carrier, which is transparent in the infrared spectral range. As such carriers are suitable, for example, silicon, sapphire or zinc selenide. Alternatively, another material which is transparent in the mid-infrared range, in particular between 2 μm inclusively and 6 μm inclusively, can also be used.

Alternatively or additionally, the filter 35 can, for example, have a plasmonic filter.

The detection arrangement furthermore comprises a form body 4 which is molded onto the emitter 2 and the detector 3 and adjoins the emitter and the detector at least in places. For example, the form body 4 has the same or substantially the same extent in the vertical direction as the semiconductor chip 21 of the emitter and/or the detector 3. The form body 4 is non-transparent, for example, predominantly reflective or predominantly absorbing, to the radiation having the peak wavelength of the emitter 2.

The form body 4 forms the mounting surface 10 of the detection arrangement. On a side facing away from the mounting surface, the emitter 2 and the detector 3 are free of material of the form body.

A main emission direction 91 of the emitter 2 and a main detection direction 92 of the detector 3 extend perpendicularly to the mounting surface 10.

The detection arrangement 1 furthermore comprises a deflection optics 6 on which radiation emitted by the emitter 2 during operation of the detection arrangement impinges. An optical path 9 is formed between the emitter and the detector 3 by means of the deflection optics. In the exemplary embodiment shown, the deflection optics is formed by a first deflection element 61 and a second deflection element 62. In a top view of the detection arrangement, the first deflection element 61 overlaps the emitter and the second deflection element 62 overlaps the detector. For example, the first deflection element and the second deflection element are each designed as a prism, wherein the radiation emitted by the emitter 2 along the main emission direction 91 in the vertical direction is deflected in a direction parallel to the mounting surface 10 and the radiation is subsequently directed along the main detection direction 92 onto the detector.

In the vertical direction, an extent of the deflection optics is, for example, between to μm inclusively and 5 mm inclusively, in particular between to μm inclusively and 1 mm inclusively.

A gas volume between the first deflection element 61 and the second deflection element 62 forms an interaction region 95.

Although the main emission direction 91 and the main detection direction 92 thus extend perpendicularly to the mounting surface 10, the optical path 9 extends through the interaction region 95 parallelly to the mounting surface. A small vertical extent of the detection arrangement 1 can thus be achieved in a simplified manner.

Gas present in the interaction region 95 may absorb radiation emitted by the emitter so that the presence and possibly the concentration of the gas to be detected can be determined on the basis of the signal detected by the detector 3. For this purpose, the peak wavelength of the radiation generated by the emitter 2 is expediently adapted to a characteristic absorption range of the gas to be detected.

For example, the gas to be detected is a carbon oxide, for example, CO or $CO_2$, a nitrogen oxide, for example, $N_2O$ or NOX, such as $NO_2$, or methane. Said gases have characteristic absorption ranges in the wavelength range between 2 μm inclusively and 6 μm inclusively, in particular between 3 μm inclusively and 5.5 μm. Due to the comparatively low absorption by water, the spectral range between 3 μm inclusively and 5.5 μm inclusively is particularly suitable for gas detection.

The form body 4 brings about a mechanically stable connection between the emitter 2 and the detector 3 so that no further element, such as a prefabricated housing, is required. In addition, the form body 4 can simultaneously form the mounting surface 10 of the detection arrangement. This results in a particularly compact design of the detection arrangement. Furthermore, the deflection optics 6 is already integrated [into] the detection arrangement 1. In other words, the detection arrangement 1 is a compact, in particular surface-mountable, design with integrated deflection optics. Furthermore, the interaction region 95 for efficient gas detection is limited by the deflection optics.

In the exemplary embodiment shown, the emitter 2 and the detector 3 each have a rear-side connector facing the mounting surface 10 and a front-side connector facing away from the mounting side. The front-side connectors are electrically conductively connected via a connection track 55 and a through-connection 41 in the form body 4 to a first contact surface 51 and a second contact surface 52, respectively. In deviation therefrom, the emitter and/or the detector can, however, also have two front-side or two rear-side connectors.

Figure 2:
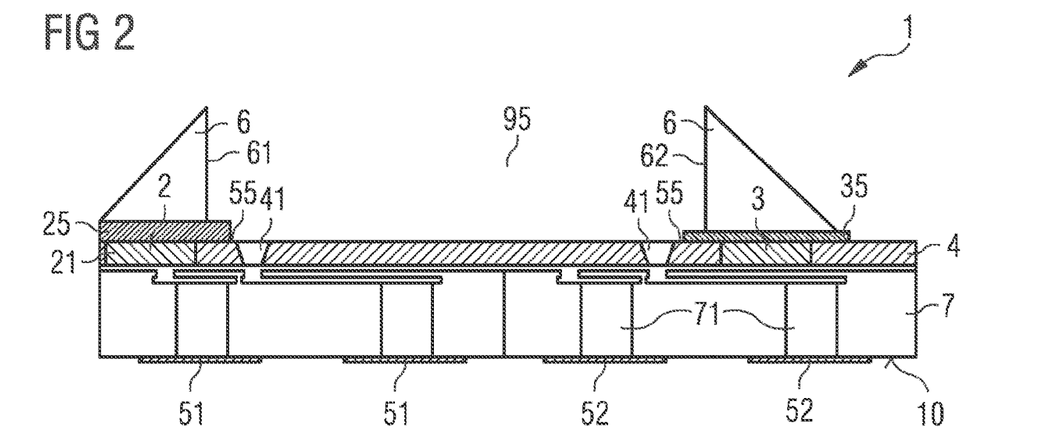

Another exemplary embodiment of a detection arrangement 1 is shown in FIG. 2 in a schematic sectional view. This second exemplary embodiment substantially corresponds to the exemplary embodiment described in connection with FIG. 1. In contrast thereto, the detection arrangement 1 has a connection carrier 7 to which the emitter 2 and the detector 3 are attached. The connection carrier 7 forms the mounting surface 10 of the detection arrangement 1. The form body 4 is formed on the side of the connection carrier facing away from the mounting surface 10. As in the preceding exemplary embodiment, the form body extends in the vertical direction up to the same height as the semiconductor chip of the emitter 2 and/or the detector 3. A planar connection of the emitter 2 or of the detector 3 via connection tracks 55 can be achieved by means of the form body 4.

The connection carrier 7 has openings 71, by means of which the first contact surfaces 51 are electrically conductively connected to the emitter and the second contact surfaces 52 are electrically conductively connected to the detector 3. The contact surfaces are thus arranged on the side of the connection carrier facing away from the emitter 2 and the detector 3.

Figure 3A:
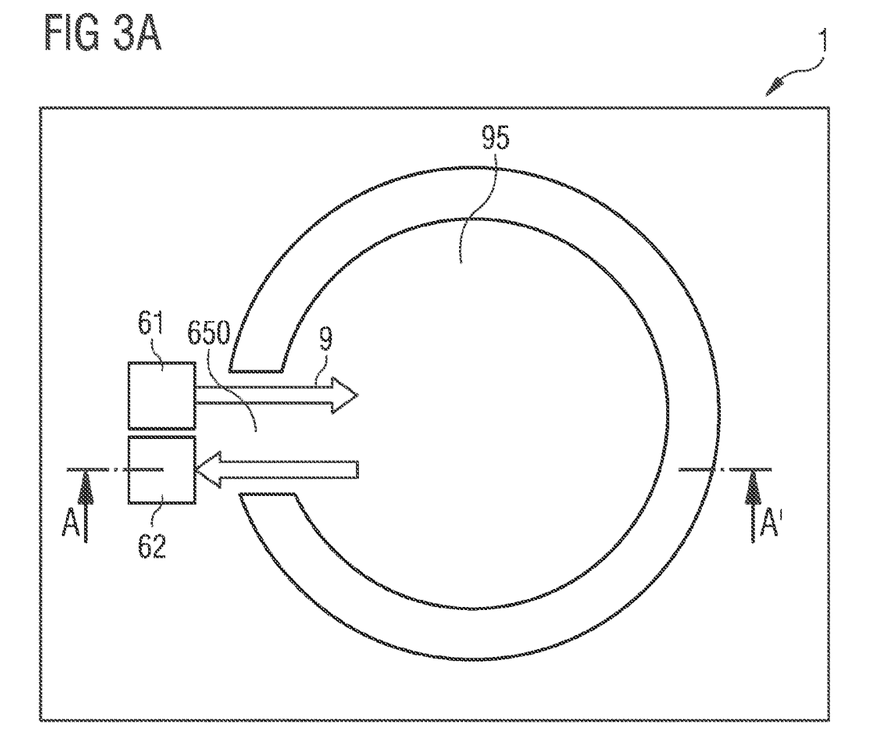
FIGS. 3A and 3B show an exemplary embodiment of a detection arrangement in a top view (FIG. 3A) and an associated sectional view (FIG. 3B)
Figure 3B:
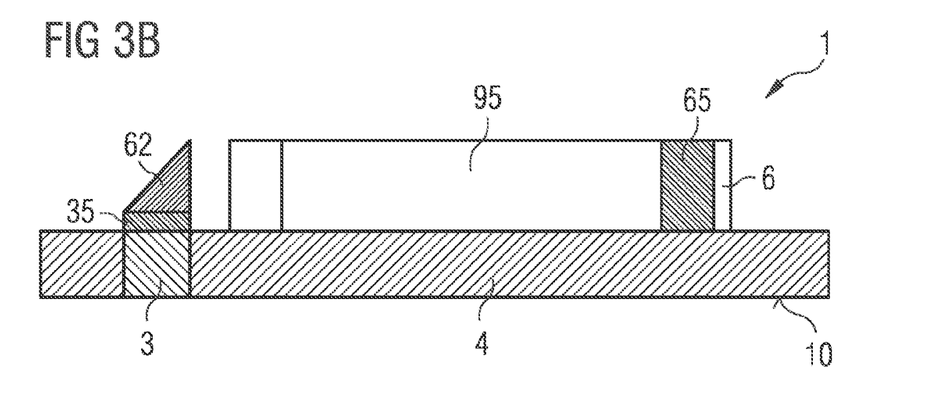

FIG. 3A shows another exemplary embodiment of a detection arrangement 1, wherein FIG. 3B shows an associated sectional view along line AA'.

This exemplary embodiment substantially corresponds to the exemplary embodiment described in connection with FIG. 1. In contrast thereto, the deflection optics 6 additionally has a reflector element 65. In a top view of the detection arrangement 1, the reflector element is annular and encloses a gas volume as interaction region 95 in places. A main emission direction of the emitter and a main detection direction of the detector 3 extend perpendicularly to the mounting surface 10. In a top view of the detection arrangement 1, the first deflection element 61 and the second deflection element 62 with the associated emitter and detector, respectively, are arranged outside of the reflector element 65. Via the first deflection element 61, a first radiation deflection of the optical path 9 takes place in a direction parallel to the mounting surface 10.

Via the inlet opening 650 of the reflector element 65, the radiation is coupled into the interaction region 95 and can impinge on the detector 3 after reflection at the reflector element 65. Via the inlet opening, a gas exchange between the environment and the interaction region 95 can also take place. On the side of the reflector element facing away from the form body 4, the detection arrangement can have a cover. In order to avoid interference radiation, the cover is expediently non-transparent to the radiation having the peak wavelength emitted by the emitter 2. For ease of illustration, the cover is not shown in the figure.

Figure 4A:
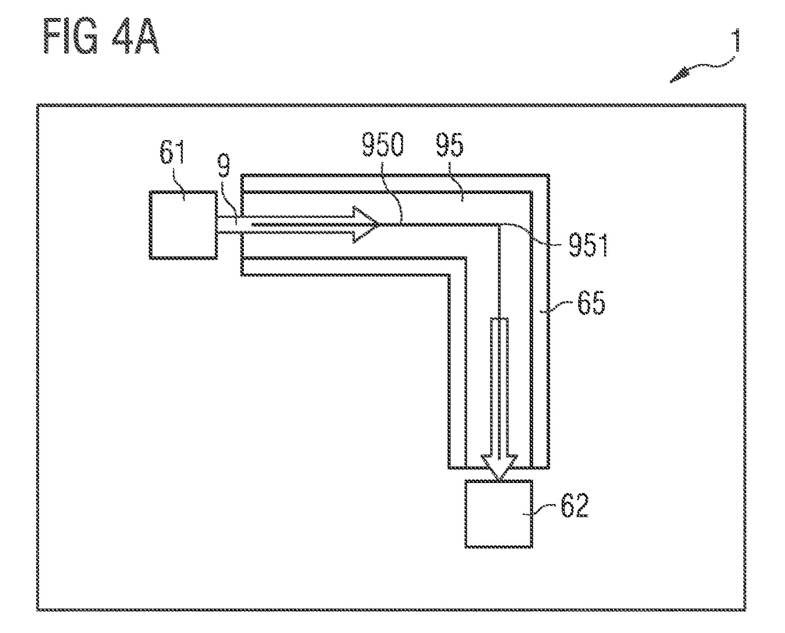
FIGS. 4A, 4B and 4C each show an exemplary embodiment of a detection arrangement in a top view.
Figure 4B:
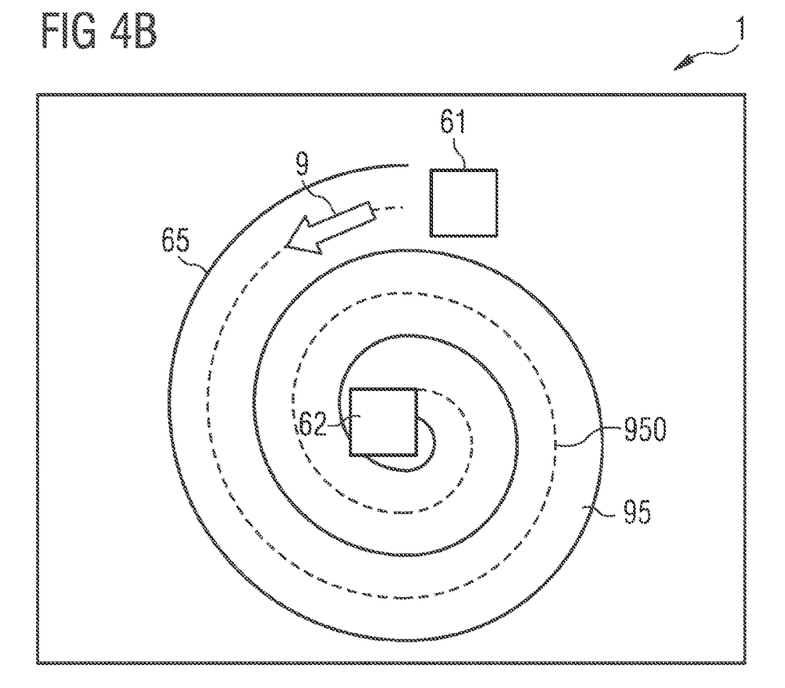
Figure 4C:
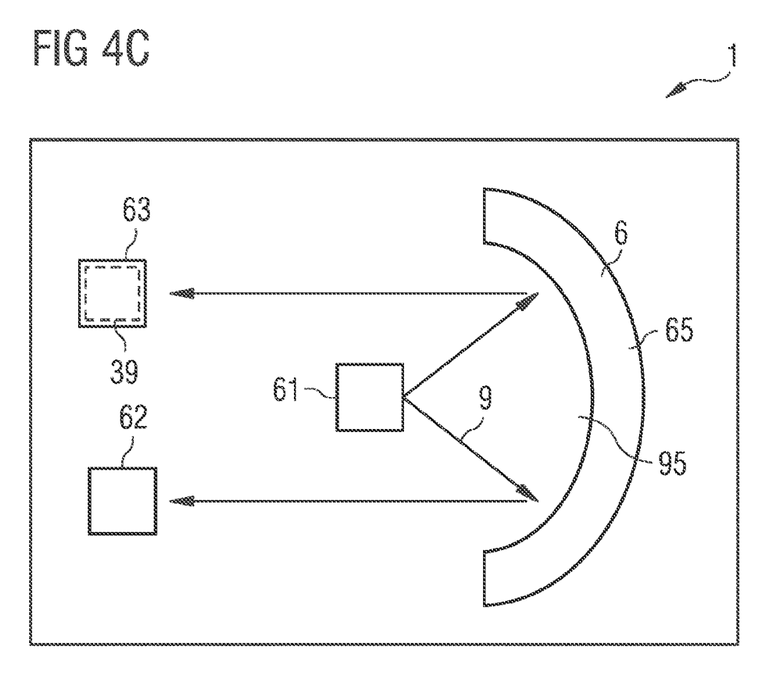

In FIGS. 4A to 4C, exemplary embodiments of the detection arrangements 1 are shown in top view, which embodiments substantially correspond to the exemplary embodiment described in connection with FIGS. 3A and 3B. In contrast thereto, the reflector element 65 in the exemplary embodiment illustrated in FIG. 4A is elongate, with a main axis of extent 950 having a kink 951. Instead of a kink, a bend can also be used. More than one kink and/or more than one bend may also be provided. Such an embodiment forms a folding of the optical path so that the optical path between the emitter 2 and the detector 3 is longer than the distance between the detector and the emitter. For example, the optical path is at least twice as long as the distance between the emitter 2 and the detector 3. The optical path can thus be increased by means of the interaction region 95 with the same lateral and vertical extent of the detection arrangement. Efficient detection with a simultaneously compact design of the detection arrangement can be achieved in a simplified manner.

In the exemplary embodiment shown in FIG. 4B, the main axis of extent 950 is spiral. A long optical path between the emitter and the detector can thus already be achieved with a comparatively small distance between the emitter and the detector and a compact design of the detection arrangement. Of course, the specific design of the main axis of extent 950 can be varied within wide limits with one or more kinks and/or at least one curved region.

The detection arrangement according to the exemplary embodiment shown in FIG. 4C has a further detector 39 in addition to the detector 3. Radiation can be coupled into the further detector 39 via a third deflection element 63. Radiation emitted by the emitter can impinge in part on the detector 3 and in part on the further detector 39. In contrast to the detector 3, the further detector 39 is, for example, sensitive in a broader spectral range than the detector 3 so that the further detector can serve as a reference detector for monitoring the emitter 2. For example, the detector 3 and the further detector 39 are of identical design and differ only by the filter arranged upstream of the detector 3.

Of course, such a reference detector can also be used in the exemplary embodiments described above and below.

Figure 5A:
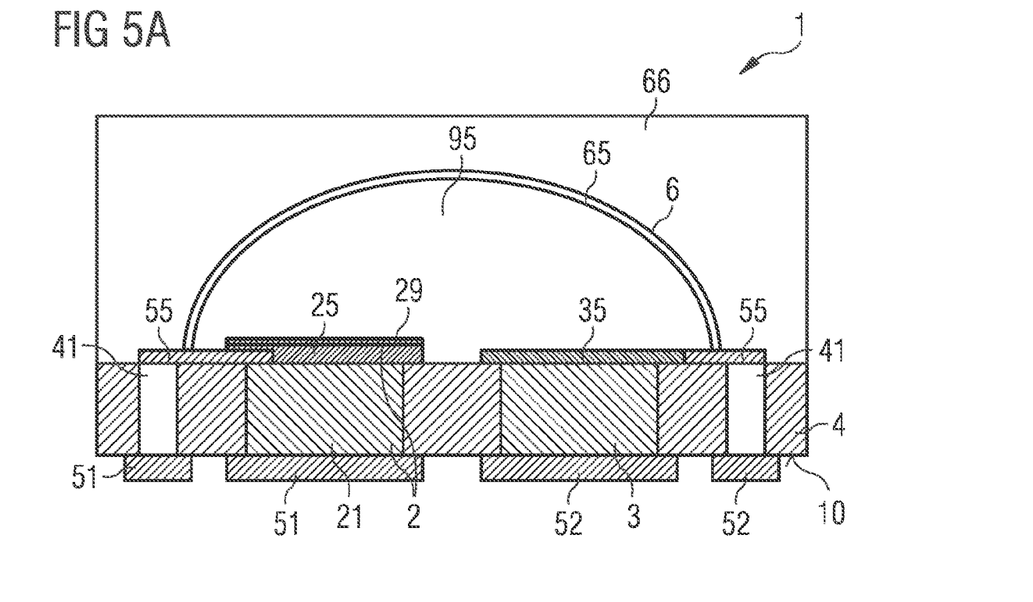
FIGS. 5A and 5B show an exemplary embodiment of a detection arrangement in a perspective view (FIG. 5B) and associated sectional view (FIG. 5A)
Figure 5B:
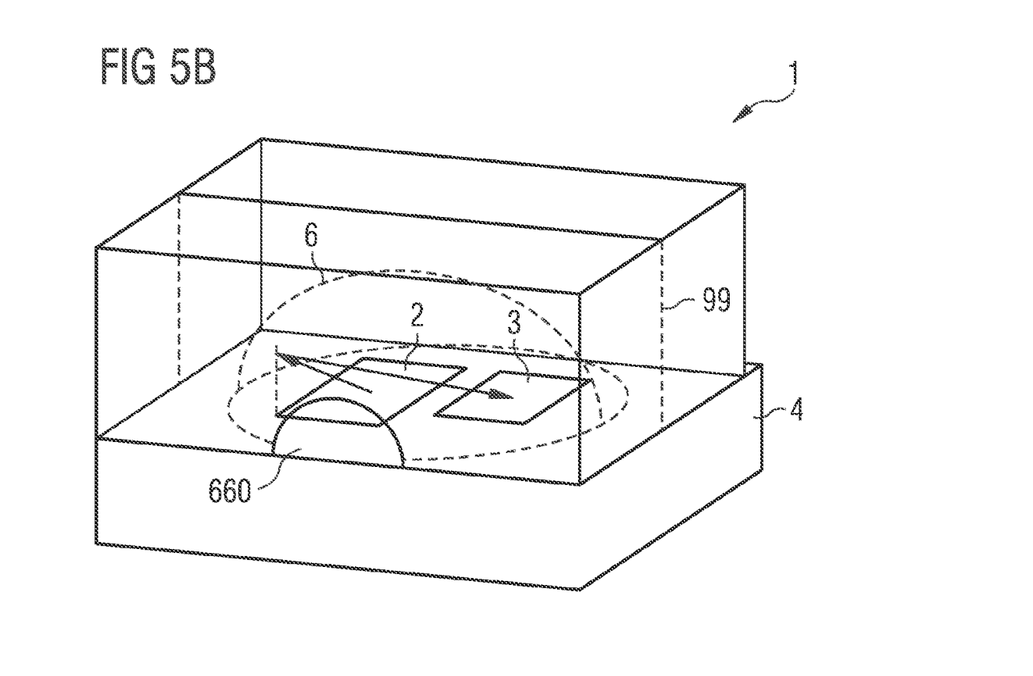

A further exemplary embodiment of a detection arrangement 1 is shown in FIGS. 5A and 5B, wherein FIG. 5A shows a sectional view along a sectional plane 99 of the perspective view in FIG. 5B.

This exemplary embodiment essentially corresponds to the exemplary embodiment described in connection with FIG. 1. In contrast thereto, the deflection optics 6 delimits a gas volume as interaction region 95 above the emitter 2 and the detector 3 on a side facing away from the mounting surface 10. The deflection optics 6 are formed by a reflector element 65. For example, the reflector element has a basic shape of a segment of a rotational ellipsoid or a sphere. A further form body 66, which mechanically stabilizes the reflector element 65, is arranged on the side of the reflection element facing away from the interaction region 95. For gas exchange between the interaction region 95 and the environment, an opening 660 is formed in the further form body 66.

In contrast to the previous exemplary embodiments, the optical path extends within the interaction region 95, i.e., not predominantly parallelly to the mounting surface but obliquely or perpendicularly thereto.

In particular, the deflection optics 6 can be formed by a single optical element, namely the reflector element 65. Deflection elements, which deflect the emitted radiation of a direction perpendicular to the mounting surface in a parallel direction and vice versa, can be dispensed with.

The reflector element 65 may, for example, also have the basic shape of a segment of a cylinder surface or another complex shaped structure.

On the side facing away from the mounting surface 10, the further form body 66 may be flat and parallel to the mounting surface 10. As a result of the further form body 66, the detection arrangement can be comparatively mechanically robust. In addition, the picking-up during assembly, for example, by a pick and place method, is simplified. The risk of damage to the detection arrangement is thus reduced.

Figure 6:
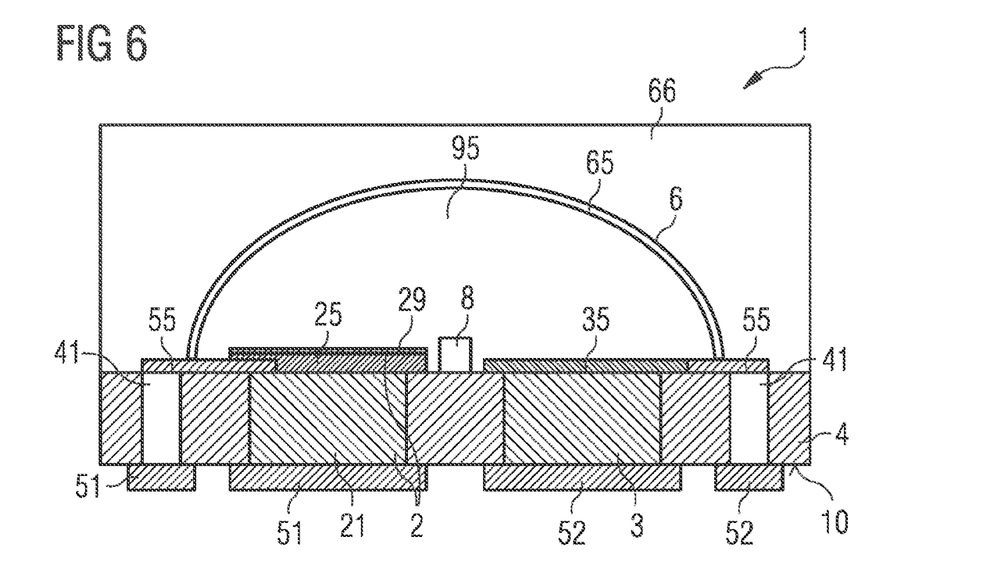
FIGS. 6, 7 and 8 each show an exemplary embodiment of a detection arrangement in a schematic sectional view.

The exemplary embodiment shown in FIG. 6 substantially corresponds to the exemplary embodiment described in connection with FIG. 5. In contrast thereto, the detection arrangement has a separating element 8. In top view of the detection arrangement, the separating element 8 is arranged between the emitter 2 and the detector 3. The separating element reduces the radiation portion which travels directly or at least on a comparatively short optical path from the emitter 2 to the detector 3. The reliability of the detection can thus be further improved.

Figure 7:
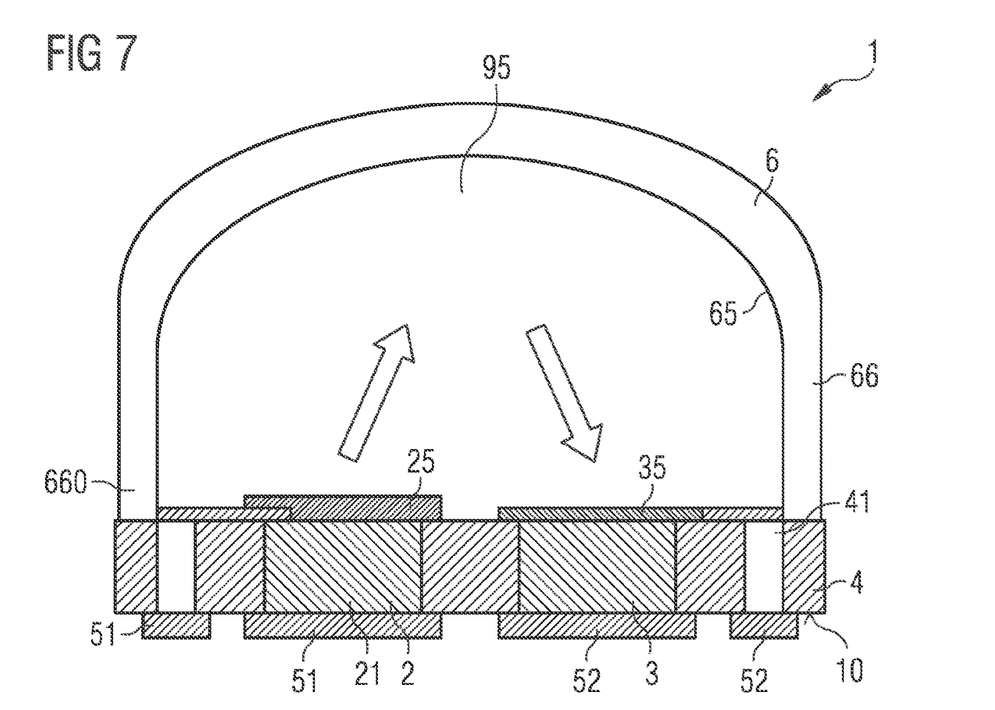

The exemplary embodiment shown in FIG. 7 substantially corresponds to the exemplary embodiment described in connection with FIGS. 5A and 5B. The deflection optics 6 is in turn formed by means of a reflector element 65 which delimits the interaction region 95 on the side facing away from the mounting surface 10. The deflection optics 6 is designed as a prefabricated optical element which is attached to the form body 4 by means of an attachment layer 83. In order to produce the detection arrangement, the further form body 66 can, for example, be coated on the inside with an in particular metallic reflector layer and subsequently attached to the form body 4 in such a way that the reflector layer faces the form body 4. For example, the further form body 66 has a domed basic shape. A polymer material is suitable for the further form body, for example.

Figure 8:
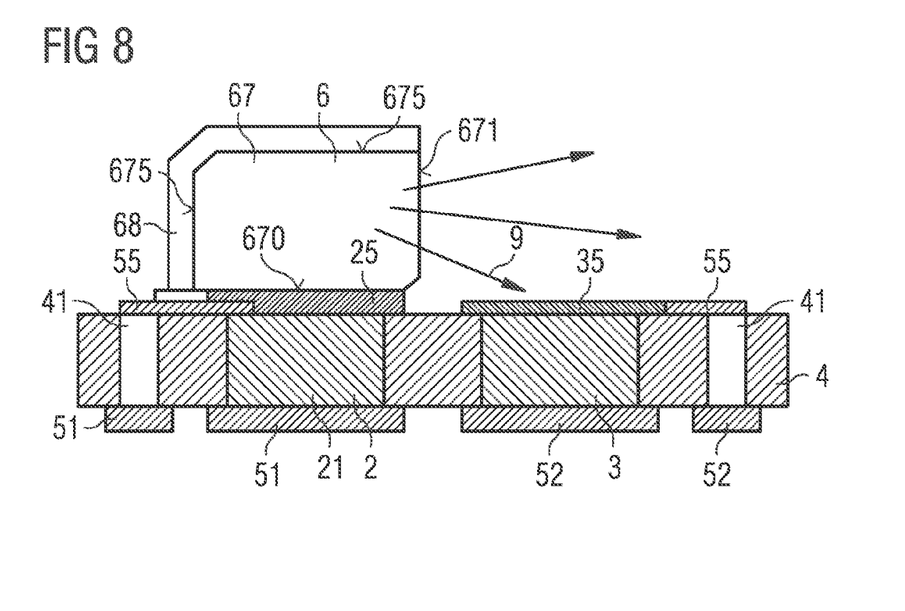

The exemplary embodiment shown in FIG. 8 substantially corresponds to the exemplary embodiment described in connection with FIG. 1.

In contrast thereto, the deflection optics 6 is formed by a scattering body 67. The radiation emitted by the emitter 2 is coupled into the scattering body via a surface 670 of the scattering body facing the emitter. After scattering within the scattering body 67, the radiation can exit through a surface 671 facing the detector 3 and impinge on the detector 3. At least one other surface 675, preferably all other surfaces of the scattering body 67, which face neither the emitter nor the detector, can be provided with a mirror layer 68. This increases the radiation portion, which impinges on the detector 3 after scattering in the scattering body 67.

A semiconductor material rich in defects, such as a silicon rich in defects, is suitable as scattering body 67, for example. For example, the scattering element has the basic shape of a cube which is provided on four sides with a mirror layer and is transparent to radiation on two sides.

The interaction with the gas to be measured takes place in the half-space above the detector 3.

Because of the compact design of the described detection arrangement, the above-described detection arrangements 1 are in particular also suitable for operation in a mobile electronic device, for example, a mobile electrical communication device, such as a smartphone or a smartwatch, or in a product worn on the body (wearable).

FIGS. 9A to 9E show an exemplary embodiment of a method for producing detection arrangements. The method is explained by way of example with reference to a detection arrangement, which is designed as described in connection with FIGS. 5A and 5B.

Figure 9A:
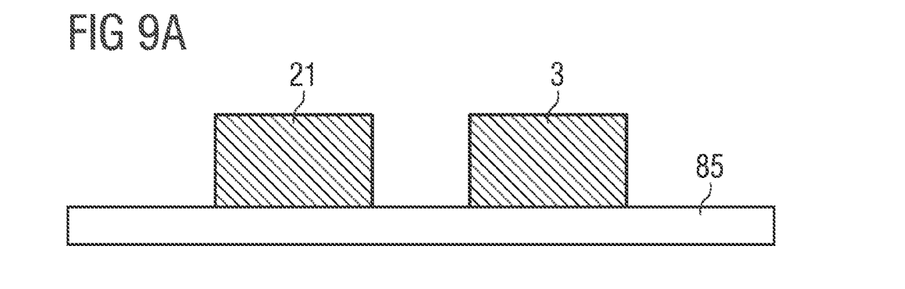
FIGS. 9A to 9E show an exemplary embodiment of a method for producing a detection arrangement on the basis of intermediate steps respectively shown in a schematic sectional view.

As shown in FIG. 9A, a plurality of semiconductor chips 21 are provided for one emitter each and a plurality of detectors. For example, the semiconductor chips and the detectors are arranged on an auxiliary carrier 85. For example, the auxiliary carrier is an in particular self-adhesive film. Alternatively, a rigid auxiliary carrier can also be used. Subsequently, an arrangement group 15 with the emitters 2 and the detectors 3 is formed.

For ease of illustration, only a partial region of the arrangement group 15 is shown, from which precisely one detection arrangement emerges during later separation.

Figure 9B:
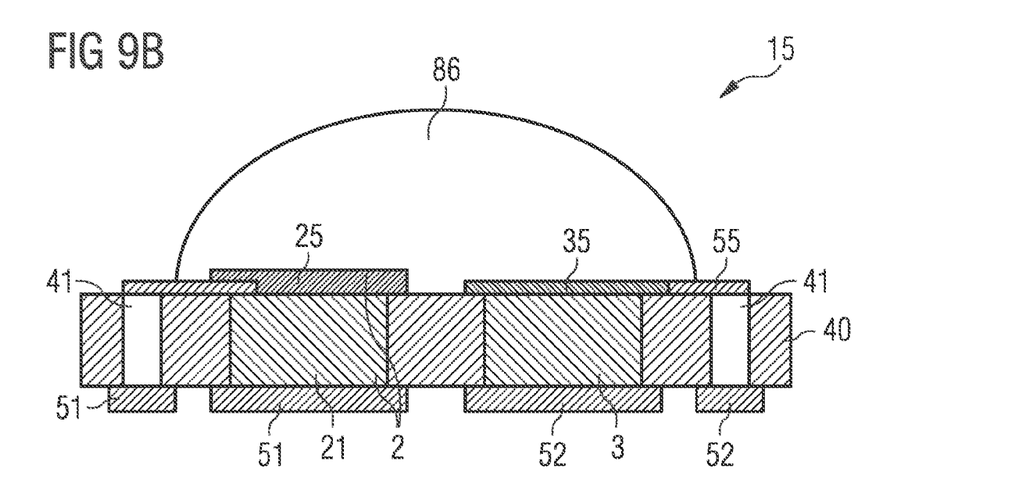

In the exemplary embodiment shown in FIG. 9B, the semiconductor chips 21 of the emitters 2 and the detectors 3 are insert-molded using a molding compound 40 in order to form the arrangement group 15. This can be done by means of a casting method, for example.

A casting method is generally understood as a method with which a molding compound is formed according to a predetermined shape and can be cured, if necessary. In particular, the term "casting method" includes molding, film-assisted molding, injection molding, transfer molding and compression molding.

After the curing of the molding compound 40, a radiation conversion element 25 is applied to the semiconductor chip 21 in order to form the emitter 2. A filter 35 is optionally applied to the detector 3.

Through-connections 41 which extend in the vertical direction through the molding compound 40 are formed in the molding compound 40. The emitter 2 and the detector 3 are electrically conductively connected to a first contact 51 and a second contact 52, respectively, via the through-connections 41 and connection tracks 55 applied to the molding compound 40. The connection tracks can in particular be applied planarly to the molding compound 40. In comparison to connecting via bonding wires, a particularly compact design can thus be achieved.

In order to produce a detection arrangement as described with reference to FIG. 2, the semiconductor chips for the emitters and the detectors can also be applied to a connection carrier and subsequently insert-molded using a molding compound. An auxiliary carrier is not required in this case.

A plurality of deflection optics 6 is subsequently assigned to the arrangement group 15. For this purpose, as shown in FIG. 9B, a sacrificial layer 86 is applied. In a top view of the arrangement group, the sacrificial layer overlaps the emitter 2 and the detector 3. In particular, the emitters 2 and the detectors 3 are respectively arranged completely within an assigned partial region of the sacrificial layer 86, wherein adjacent partial regions are respectively spaced apart from one another.

Figure 9C:
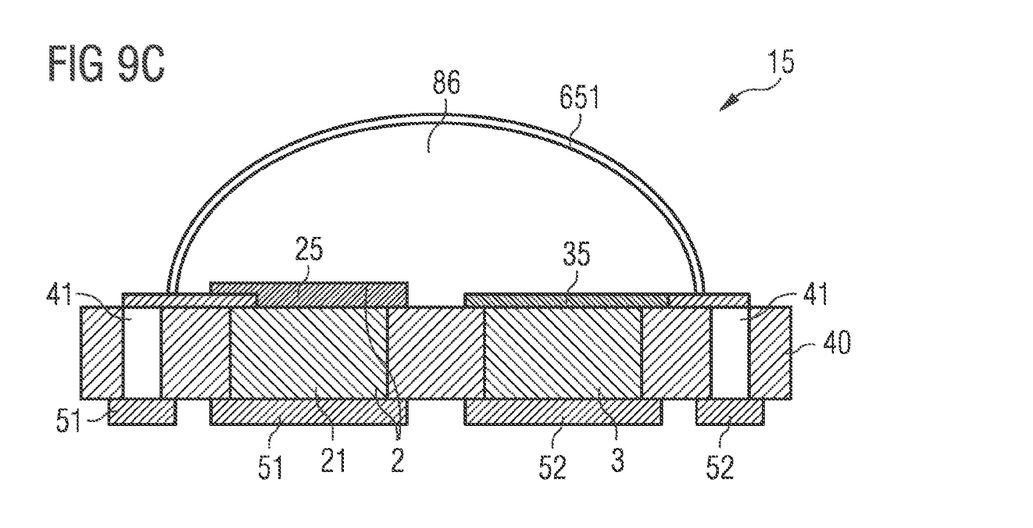

A reflector element 65 in the form of a reflector layer 651, for example, a metallic coating, is applied to the sacrificial layer 86 (FIG. 9C).

Figure 9D:
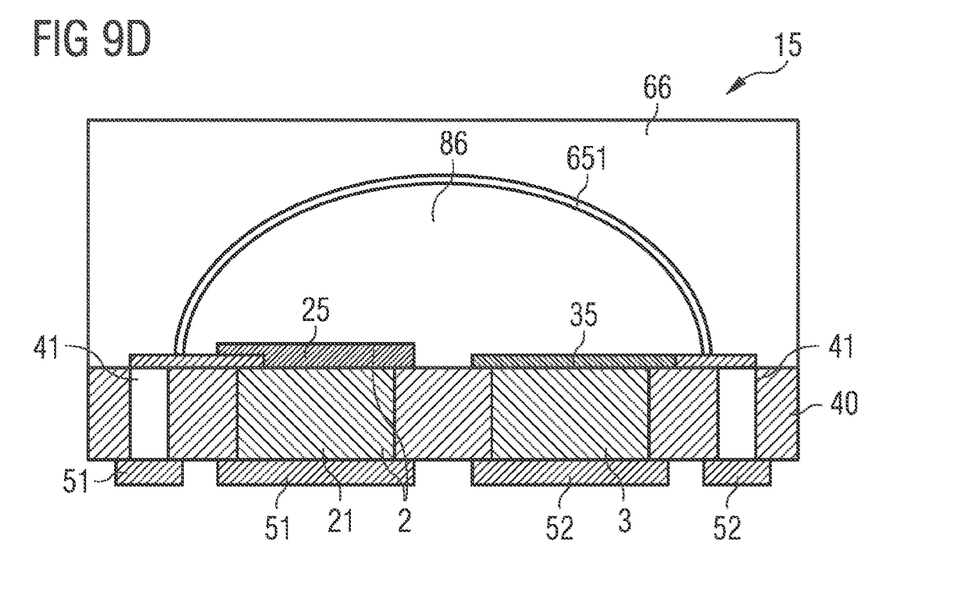

A further form body 66 is subsequently applied to the reflector element 65. A casting method can be used for this purpose. The further form body fills in particular intermediate spaces between adjacent reflector elements 65. The further form body 66 can adjoin the form body 4 in places in these intermediate spaces. On the side facing away from the form body 4, the further form body 66 is preferably designed to be flat (FIG. 9D).

The sacrificial layer 86 is subsequently removed. For example, the sacrificial layer is removed by means of a solvent. For this purpose, the solvent can be introduced via openings in the further form body 66 (cf. FIG. 5B).

Figure 9E:
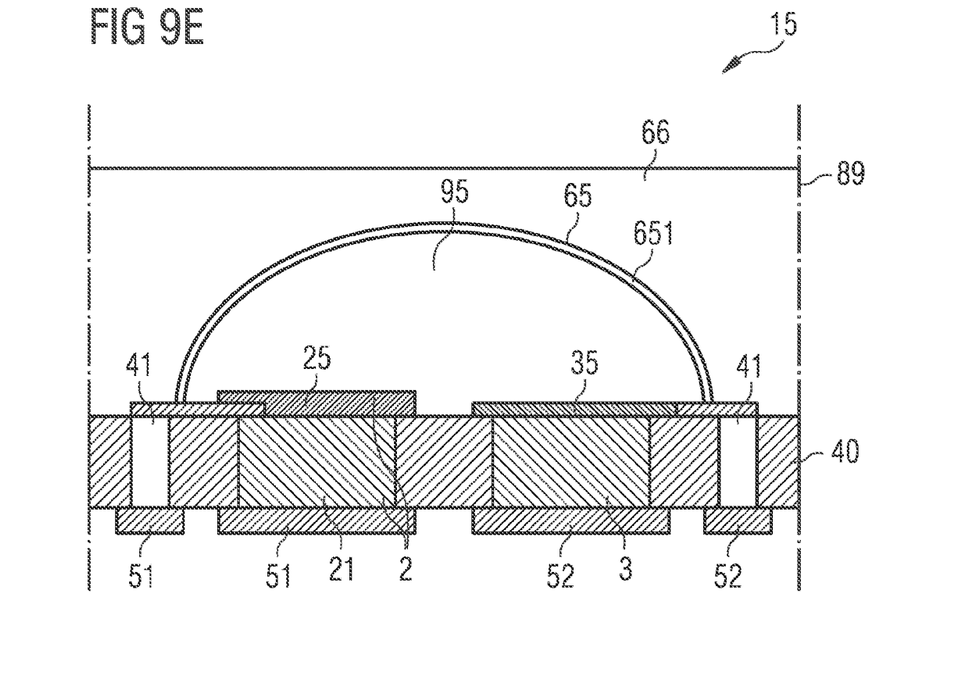

The removal of the sacrificial layer 86 produces an interaction region 95, which is delimited in the vertical direction by the reflector element 65.

The deflection element in the form of the reflector element 65 is thus formed directly on the arrangement group 15. A compact and cost-effective production is thus simplified.

Lastly, the arrangement group 15 is separated into the detection arrangement 1 along separation lines 89. During separation, the molding compound 40 and the further form body 66 are severed. This can, for example, be done by means of a mechanical method, such as sawing, chemically, for example, by means of etching or by means of coherent radiation. The side surfaces of the form bodies produced from the molding compound 40 and the side surfaces of the further form body 66 may have marks characteristic of the separation process, for example, saw marks, marks of material removal by laser radiation or of chemical material removal.

In deviation from the described exemplary embodiment, the deflection optics 6 may also be arranged in prefabricated form on the arrangement group. For this purpose, the deflection optics 6 can each be assigned individually to the associated emitters or the deflection optics are provided in an optics group which is severed when the arrangement group 15 is separated.

With the described method, detection arrangements 1 can be produced with a high packing density in an arrangement group. The detection arrangements arising during separation already have a deflection optics with which an optical path through an interaction region with a gas is formed.

Figure 10A:
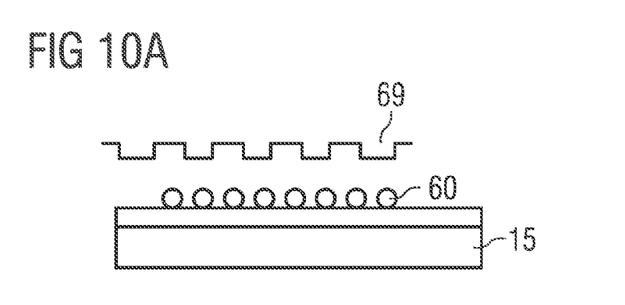
FIGS. 10A to 10C show an exemplary embodiment of the production of a deflection optics on the basis of intermediate steps schematically illustrated in a sectional view.
Figure 10B:
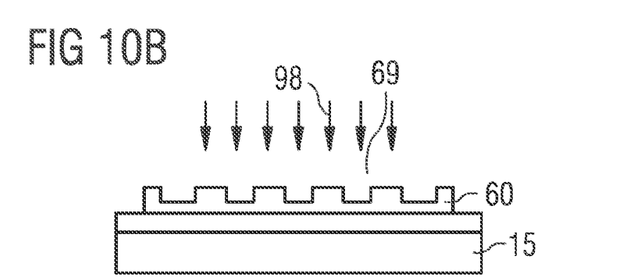
Figure 10C:
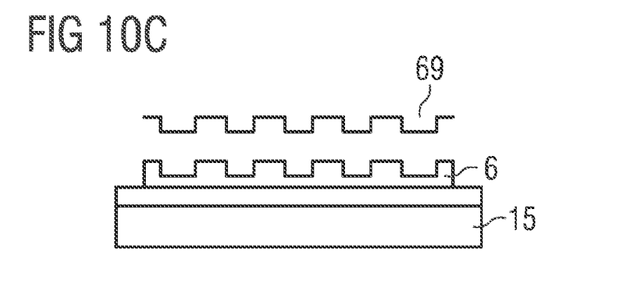

FIGS. 10A to 10C show an exemplary embodiment for the production of a deflection optics 6. An optical compound 60 is applied to the arrangement group 15 for this purpose. A template 69 is pressed into the optical compound 60 so that the optical compound is molded onto the template. The optical compound is cured by means of radiation, represented by an arrow 98, for example, radiation in the ultraviolet spectral range, or at least hardened to such an extent that the optical compound 60 is dimensionally stable. The template 69 can subsequently be removed. By such a molding process, deflection optics can be formed simply, inexpensively and extensively, in particular directly on the arrangement group 15.

Suitable for the optical compound is, for example, a polymer material, in particular an inorganic/organic hybrid polymer. Such materials are sold, for example, under the trademark "Ormocer" by the Fraunhofer-Gesellschaft zur Förderung der angewandten Forschung e.V. in Munich (www.ormocere.de).

The described method does not necessarily have to be carried out on the arrangement group 15. Alternatively, an auxiliary carrier can also be used, from which the deflection optics 6 produced is transferred to the arrangement group 15. In this case, the deflection optics 6 can be provided with a reflective coating, for example, a metal-containing coating, prior to the application to the arrangement group. Gold is distinguished in particular by high reflectivity in the infrared range. Alternatively, the more cost-effective aluminum may be used.

The invention is not limited by the description based on the exemplary embodiments. Rather, the invention encompasses any novel feature as well as any combination of features, including in particular any combination of features in the claims, even if this feature or combination itself is not explicitly specified in the claims or the exemplary embodiments.

The invention claimed is:

1. A detection arrangement comprising:
   an emitter configured to generate radiation having a peak wavelength in an infrared spectral range;
   a detector configured to receive the radiation;
   a mounting surface comprising at least a first contact surface and a second contact surface for external electrical connection of the detection arrangement;
   a form body adjoining the emitter and the detector at least in places; and deflection optics configured to deflect the radiation during operation of the detection arrangement so that an optical path is formed between the emitter and the detector by the deflection optics, the deflection optics covering only a portion of the optical path, wherein the deflection optics comprise a scattering body having a first surface into which the radiation enters the scattering body and a second surface from which the radiation exits the scattering body during the operation, wherein the first surface faces the emitter and the second surface is non-parallel to the mounting surface, wherein the optical path extends parallel to the mounting surface in places, wherein the scattering body comprises a crystal structure, and wherein defects in the crystal structure are configured to cause scattering.

2. The detection arrangement according to claim 1, wherein each of the emitter and the detector is electrically conductively connected via a through-connection through the form body to the first contact surface and the second contact surface, respectively.

3. The detection arrangement according to claim 1, wherein the form body is the mounting surface.

4. The detection arrangement according to claim 1, wherein the form body is arranged on a connection carrier, and wherein a side of the connection carrier, facing away from the form body, is the mounting surface.

5. The detection arrangement according to claim 1, wherein the deflection optics delimit a gas volume above the emitter and the detector on a side facing away from the mounting surface.

6. The detection arrangement according to claim 1, wherein the detection arrangement is configured to detect a gas, and wherein the peak wavelength is adapted to an absorption range of the gas.

\* \* \* \* \*